United States Patent
Partanen

(10) Patent No.: US 7,444,640 B2
(45) Date of Patent: Oct. 28, 2008

(54) CONTROLLING PROCESSING NETWORKS

(75) Inventor: Jukka T. Partanen, Espoo (FI)

(73) Assignee: Nokia Corporation, Espoo (FI)

( * ) Notice: Subject to any disclaimer, the term of this patent is extended or adjusted under 35 U.S.C. 154(b) by 973 days.

(21) Appl. No.: 10/485,851

(22) PCT Filed: Aug. 5, 2002

(86) PCT No.: PCT/IB02/03533

§ 371 (c)(1), (2), (4) Date: Feb. 4, 2004

(87) PCT Pub. No.: WO03/014929

PCT Pub. Date: Feb. 20, 2003

(65) Prior Publication Data

US 2004/0205761 A1 Oct. 14, 2004

(30) Foreign Application Priority Data

Aug. 6, 2001 (GB) .................. 0119145.1

(51) Int. Cl.
G06F 9/46 (2006.01)
G06F 15/173 (2006.01)

(52) U.S. Cl. .................. 718/105; 718/104; 709/226; 709/238

(58) Field of Classification Search .......... 718/104, 718/105, 102; 709/201, 203, 219, 226, 238
See application file for complete search history.

(56) References Cited

U.S. PATENT DOCUMENTS

| | | | | |
|---|---|---|---|---|
| 5,031,089 A * | 7/1991 | Liu et al. | ..................... | 709/226 |
| 5,537,468 A * | 7/1996 | Hartmann | .............. | 379/221.01 |
| 5,867,706 A * | 2/1999 | Martin et al. | ................ | 718/105 |
| 5,898,870 A * | 4/1999 | Okuda et al. | ................. | 718/104 |
| 6,026,425 A * | 2/2000 | Suguri et al. | ................. | 718/105 |
| 6,078,960 A * | 6/2000 | Ballard | ........................ | 709/229 |
| 6,167,427 A * | 12/2000 | Rabinovich et al. | ......... | 709/201 |
| 6,173,306 B1 * | 1/2001 | Raz et al. | ..................... | 718/102 |
| 6,385,636 B1 * | 5/2002 | Suzuki | ....................... | 718/105 |
| 6,393,458 B1 * | 5/2002 | Gigliotti et al. | ............. | 709/203 |
| 6,986,139 B1 * | 1/2006 | Kubo | .......................... | 718/105 |
| 2001/0034752 A1 * | 10/2001 | Kremien | ..................... | 709/105 |
| 2002/0165900 A1 * | 11/2002 | Kubo et al. | ................. | 709/105 |
| 2004/0216114 A1 * | 10/2004 | Lin | ............................ | 718/105 |

OTHER PUBLICATIONS

Evans et al., Load Balancing with networkpaartitioning using host groups, 1994,Parallel computing, pp. 325-345.*
Ahmad et al., Performance prediction of distributed load balancing on multicomputer systems, 1991, ACM, pp. 830-839.*
Mofaddel, Mahmoud et al., "User-Profile Adaptable Resource Management System for Workstation Cluster Architectures," Proceedings of the 24th EUROMICRO Conference, 1998.

* cited by examiner

Primary Examiner—Meng-Ai An
Assistant Examiner—Caroline Arcos
(74) Attorney, Agent, or Firm—Squire, Sanders & Dempsey L.L.P.

(57) ABSTRACT

According to an embodiment of the invention, a method is provided for allocating load to processing nodes in a processing cluster arranged as an object dependency network. The method includes establishing at a load allocation function a plurality of load allocation function attributes whose values are dependant on the values of attributes of the processing nodes, and receiving requests for processing. The method further includes determining to which of the processing nodes to allocate the requests for processing based on the load allocation function attributes, and allocating requests for processing to the processing nodes in accordance with that determination.

11 Claims, 6 Drawing Sheets

CONTROLLING PROCESSING NETWORKS

FIELD OF THE INVENTION

This invention relates to controlling processing networks, for example to achieve load balancing between multiple processors.

BACKGROUND OF THE INVENTION

Distributed data processing systems are becoming widely used for complex processing tasks. By distributing processing between a number of processors such systems are capable of performing complex tasks rapidly. However, to optimise their performance software that is allocated to a distributed system must be split efficiently between the available processors. Some software is specially written for multi-processor systems and includes instructions indicating which parts of the software are to be performed in parallel by which processors. However, this does not take account of other tasks that the processors may have to interleave with the software, and it cannot account for configurations of processors that were unknown to the software designer or that have arisen because of partial failure or upgrading of a standard multi-processor system. There is therefore a need for an effective and more generic system of load balancing.

A sophisticated multi-processor data processing system may be considered as cluster of processing nodes (CPUs) and a load balancer function. The load balancer function allocates tasks to the processors according to pre-defined rules. When software for providing a certain service is to be run by the cluster, the processes involved in the software may be divided so that a number of processing nodes are participating in the providing of the service in a load sharing fashion. Those processing nodes are termed a load sharing group. The nodes are not restricted to participating in the providing of only one service; instead multiple software functions can be allocated to a node. In addition a node will always be spending some time executing software related to the maintenance of the cluster and the node itself (i.e. the platform). Therefore the processing node requires some processing capacity just to perform its normal maintenance duties.

For each service allocated to a node there will typically be a number of processing entities (processes) executing, each of which provides some part of the service. In some cases there will even be multiple instances of the same process executing to increase parallelism and fault isolation.

The overall performance of the cluster is very dependant on the principle used by the load balancer to allocate load to the available nodes. If a node is overloaded then the results of its processing is likely to be delayed. This can be especially serious when those results are to be used by another processor because serial delays can then build up.

SUMMARY OF THE INVENTION

Aspects of the present invention are set out below and in the accompanying independent claims. Preferred aspects of the invention are set out below and in the dependant claims.

BRIEF DESCRIPTION OF THE DRAWINGS

The present invention will now be described by way of example with reference to the accompanying drawings, in which.

DETAILED DESCRIPTION OF THE PREFERRED EMBODIMENTS

The following description explains the application of an object dependency network to implement the controlling function of an adaptive load balancing function in a multi-processor cluster. This provides a feedback mechanism to the allocation of load.

Figure 1:
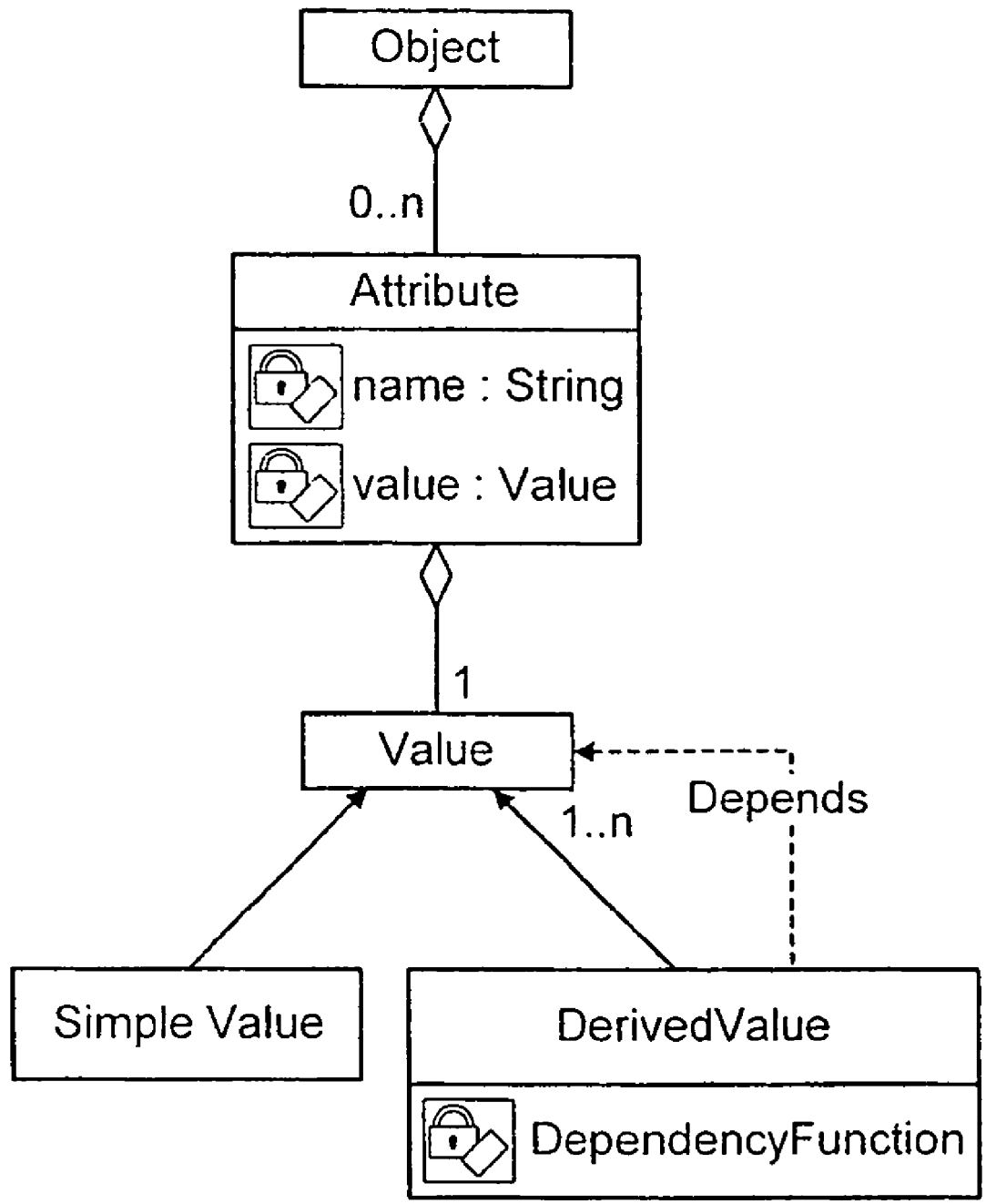
FIG. 1 illustrates the action of dependency in an object dependency network.

A state management subsystem (SM) maintains all the managed objects of the cluster. Each managed object can have various attributes. Each attribute is defined by a name and a value. An attribute value can either be a simple value, or a derived value that is calculated based on some inputs. The dependencies of a derived attribute value can be taken to describe how that value depends on the value of another attribute that is attached to the same managed object or to another managed object. An attribute value can depend on multiple values and a dependency function describes how the value is calculated based on the values it depends on. The dependency network automatically invokes the dependency function to recalculate the attribute value when any of the values the attribute depends on changes. The managed objects are organised into a hierarchical network using the order of dependencies of their attribute values. This arrangement is illustrated in FIG. 1.

The managed objects maintained in an object dependency network within the SM have attributes that correspond to the administrative state, operational state, and usage state defined in the CCITT Recommendation X.731 | International Standard ISO/IEC 10164-2. The value of an administrative state attribute can set by the operator via an O&M interface to one of the following: unlocked, shutting down, and locked. An administrative state attribute value set to unlocked means that the software or hardware entity represented by the managed object can perform its normal duties freely. A locked value means that the entity is administratively prohibited to perform its normal duties. A shutting down value means that the entity can process whatever ongoing service requests it has, but not take on any new work, and when the ongoing service requests are finished, the administrative state automatically transitions to the locked value.

The operational state attribute of a managed object can have either the enabled or disabled value and it is controlled by the system (i.e. the object itself or the management system by some means, e.g. supervision). An enabled value means that the entity represented by the managed object is functioning properly and is able to perform its duties normally. A disabled value means that the entity is not functioning properly and is not able to perform its duties (i.e. it is considered faulty).

Figure 2:
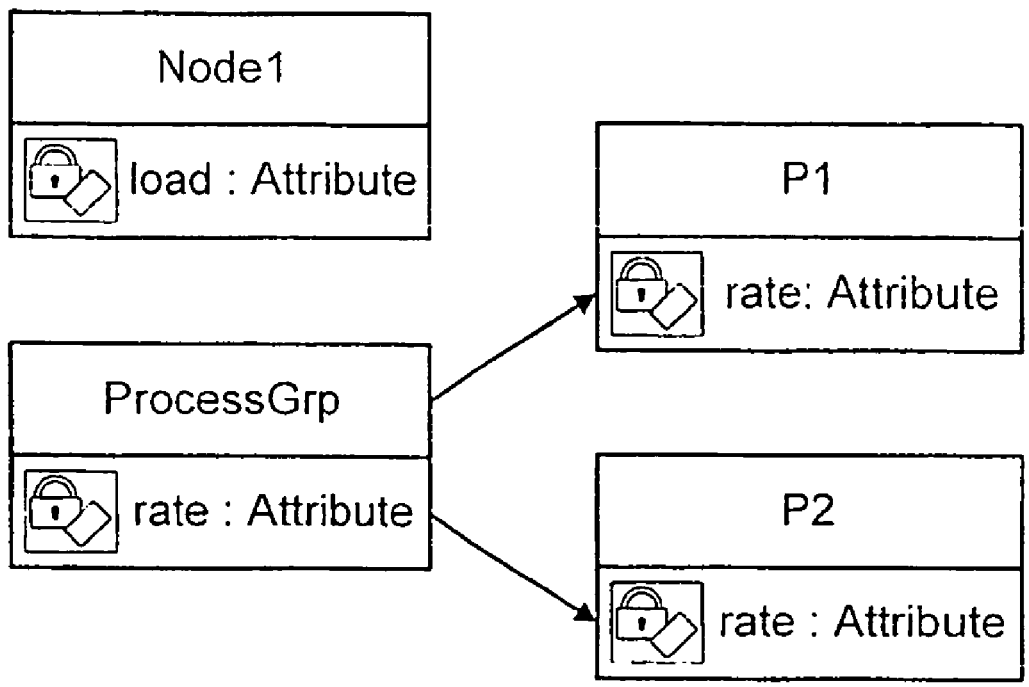
FIG. 2 illustrates node, process group and process objects, having attributes in an object dependency network.
Figure 2:
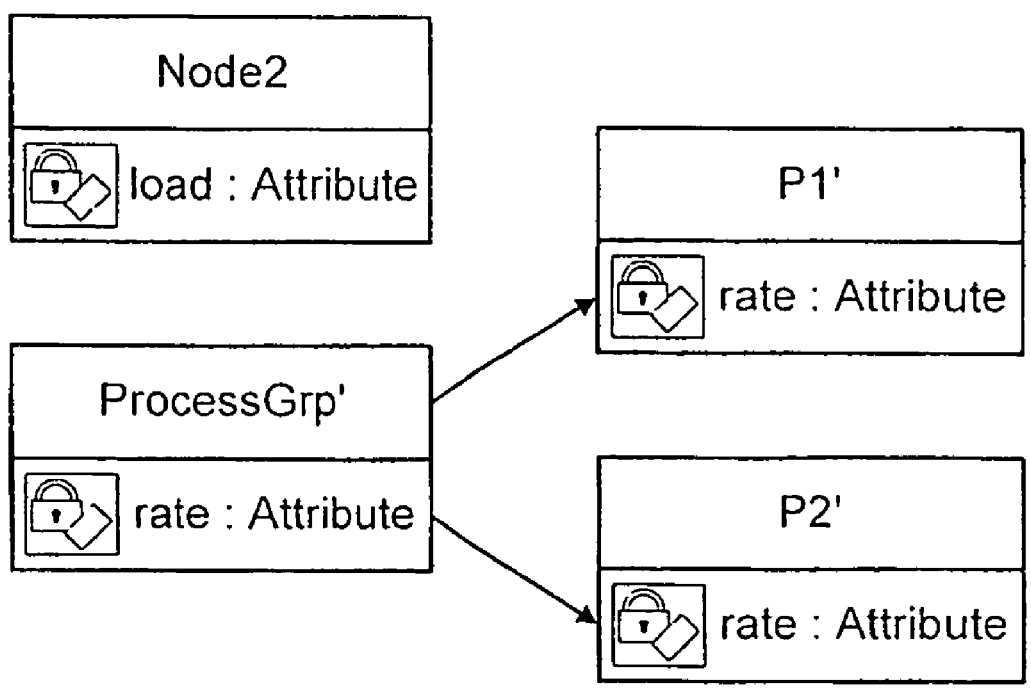

Ultimately the providing of a service can be reduced to the processing of service requests by processes. Each process has the ability to count the number of service requests it processes, map the number against time, and thus construct a service request rate for itself. The service request rate can be expressed as messages per second, transactions per second, or something similar. In SM each process is represented as a managed object that has a rate attribute which corresponds to the rate of service requests it is processing and whose value is controlled by that process itself. This arrangement is illustrated in FIG. 2.

The processes that participate in the providing of a given service on a given node are grouped into a larger entity that aggregates their work. The service is represented as a process group managed object with its own aggregate rate attribute in the SM. Dependencies between the process group and the processes are defined so that the group determines that aggregate rate attribute by adding together the values of the rate attributes of the processes into a total rate attribute value.

Each node is able to measure the current CPU load that is generated by the processing of the various service requests it is handling. It can be assumed that an increase in the rate of service requests will eventually be reflected as an increase in the CPU load, and a decrease in the rate of service requests will decrease the load. The CPU load can be expressed as the percentage of CPU cycles that are not allocated to the system idle process during a given interval (e.g. over a second). Each node is represented in SM as a managed object with a load attribute.

A load balancing function divides the external load coming to the cluster to the load sharing nodes according to a predefined principle. The load balancer can be programmed to give a certain proportion of the external load to a given node. This proportion can be expressed with a share value (W) which can, for instance, be expressed as an integer. The sum total of share values for all the available nodes (denoted by $W_{total}$) would then represent the total load that is to be processed by the nodes in the load sharing group.

The dependency network described herein comprises a set of nodes, process groups, and the processes themselves. In applying the object dependency network to control load balancing it is useful to add a correlator object whose value depends both on the values of the node load attribute and the process group rate attribute. The correlator object has a nominal load attribute, a nominal rate attribute, and a load share attribute. The nominal load attribute describes what percentage of the CPU should be used in typical load situation. It should always be significantly less than 100% so that the system can deal with short bursts of heavy load without problems.

The dependency function of the correlator's load share attribute value is defined so that it will recalculate the load share value when the observed load and observed service rates change in the following manner. Let $r_r$ be the ratio of observed rate and the nominal rate, and $r_l$ the ratio of observed load and the nominal load. Then a delta function is defined $$r_l = \frac{load}{load_n}; r_r = \frac{rate}{rate_n}$$

$$\text{delta}(r_r, r_l) = \begin{cases} D: r_l > 1 + \varepsilon_{high} \\ d: r_l \leq 1 + \varepsilon_{high} \wedge r_r > 1 + \delta_{high} \\ i: r_l < 1 - \varepsilon_{low} \wedge 1 - \delta_{low} \leq r_r \leq 1 + \delta'_{high} \\ 0: \text{otherwise} \end{cases}$$

where D is a large decrease (a predetermined negative number), d is a small decrease (a predetermined negative number of smaller magnitude), i is an increase (a predetermined positive number), $\varepsilon_{high}$ is an upper threshold for the load, $\varepsilon_{low}$ is a lower threshold for the load, $\delta_{low}$ is a lower threshold for the rate, and $\delta_{high}$ is an upper limit for the rate. The thresholds and limits can be expressed as percentages since the ratios are conveniently normalized to one. Other rationales for calculating whether to apply an increase or decrease could be employed.

As an alternative, a similar arrangement can be established when the load balancer is not dividing the load based on the nodes, but also between multiple processes in a single node or in multiple nodes. The behaviour of the delta function could be modified accordingly, for example by mapping a proportion of the node's total CPU usage to a process group.

Then the load share value at a given time t is calculated using the share function based on the previous share value $$\text{share}(t+1) = \text{share}(t) + \text{delta}(r_r, r_l)$$

$$\text{share}(0) = \frac{W_{total}}{N}$$

where N is the number of nodes in the load sharing group and share(0) represents the initial allocation of work to the nodes.

Figure 3:
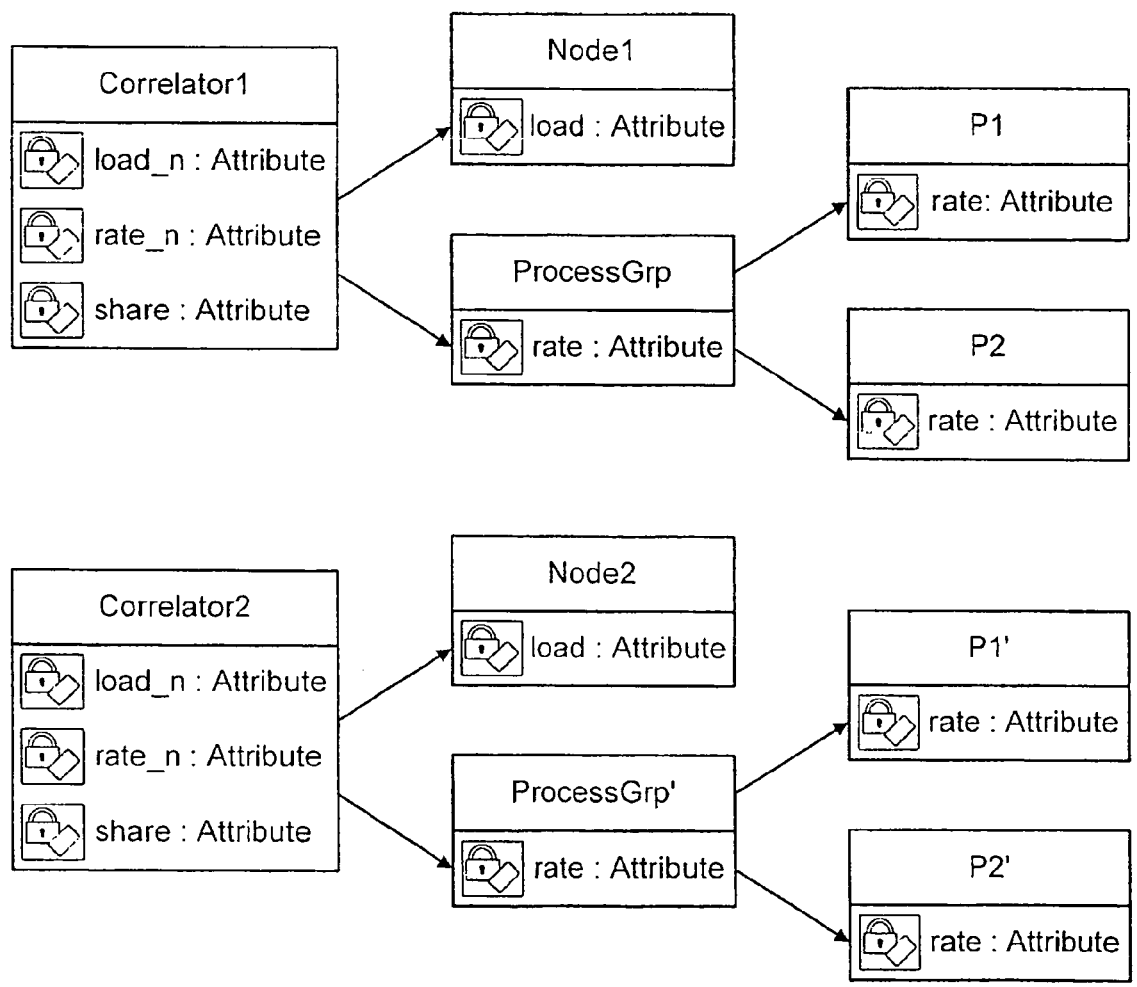
FIG. 3 illustrates correlator, node, process group and process objects, having attributes in an object dependency network.

The setup for the operation of this system is illustrated in FIG. 3.

The initial allocation can be made more elaborate if needed. However, the effect of the latter equation is that the sum total of all share values represents the total amount of work that can be allocated to the load sharing group.

The rationale behind the above delta function is as follows. If the load ratio is larger than the upper threshold, the node is overloaded and the load balancer should assign less work for it. Thus the load share value should be decreased quite a bit to make a significant reduction in the load. If the load ratio is below the upper threshold, but the rate ratio is above the upper limit, the node is processing more load than allowed, and balancer should assign less work for it, so the load share value should be decreased slightly. If the load ratio is below the lower threshold, and also the rate ratio between the lower threshold and the upper limit, the node is processing work more efficiently than assumed, and the load balancer can assign more work for it. Thus the load share value can be increased a little. Otherwise the processing of the service requests generates the desired load, and the load balancer should keep sending approximately the same amount of work to the node. Thus the share value should be kept the same. The load share value must then be communicated to the load balancer at suitable, preferably regular, intervals.

The selection of the D, d, and i values, the thresholds and limits, as well as the communication interval determine how quickly the load balancer will react to the changes in the processing capability of a node. The idea behind the large decrease and small increase is to implement behaviour similar to the TCP slow start and congestion avoidance algorithms (see IETF RFC 793, "Transport Control Protocol", September 1981) which will back off rapidly and then increase slowly until the steady state is reached. There should also be lower and upper limits for the share value that correspond to the maximum and minimum portions of the load that the load balancer can assign to a node. The values can be selected so as to achieve a desired performance.

In comparison with prior art arrangements, this approach offers the advantage that each correlator can be arranged to recalculate the load share value automatically as the observed load and rate values change. Another advantage is that the calculation is based solely on node local information, which means that the calculation of the load share values can be distributed to each node thus increasing the scalability of the overall system. Also, the system can allocate a suitable amount of work to the nodes regardless of their processing capacity, thus enabling the load sharing group to be constructed from heterogeneous nodes. This means that it is simple to add a new powerful node to the load sharing group, or to allocate some other software functions into an existing node, and the node will automatically take an appropriate share of the load to itself without the load balancer having to be configured in an elaborate way. Similarly, the arrangement can handle the situation where a node is withdrawn from a group due to a fault.

The system described above can provide feedback to and can control the load balancing function to adapt the load imposed on individual nodes to their processing capability while maintaining a very high degree of flexibility. This is illustrated below with reference to FIGS. 4 and 5.

Load share values that have been calculated as described above can be aggregated to provide input to an overload control function of the system. To achieve this the dependency network can be augmented with a service aggregation object that has a total work attribute whose value depends on the load share values of all correlators related to a given service in the system. The dependency function of the total work attribute simply sums all load share values together:

$$W(t) = \sum_{i=1}^{N} share_i(t),$$

where N is the number of active nodes in the load sharing group and $share_i(t)$ denotes the load share value of the ith correlator (i.e. node) at a given time.

If W(t) is less than the load balancer's sum total of share values (i.e. $W_{total}$), then the load sharing group cannot process the load it is exposed to and overload control should be invoked. If, on the other hand, W(t) is more than $W_{total}$, it means that there is spare capacity in the system. The overload control can be implemented in many ways, but the idea is that through the overload control the number of service requests delivered to a node is somehow reduced.

The principles described above are illustrated in FIGS. 4 to 6.

Figure 4:
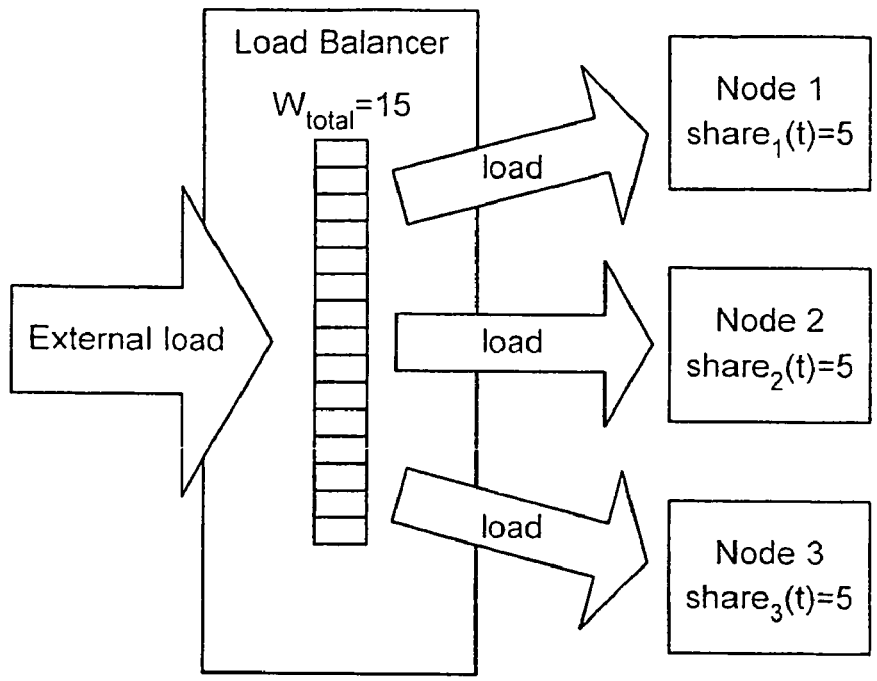
FIGS. 4 to 7 illustrate the operation of load balancing functions in a multi-processor cluster.
Figure 5:
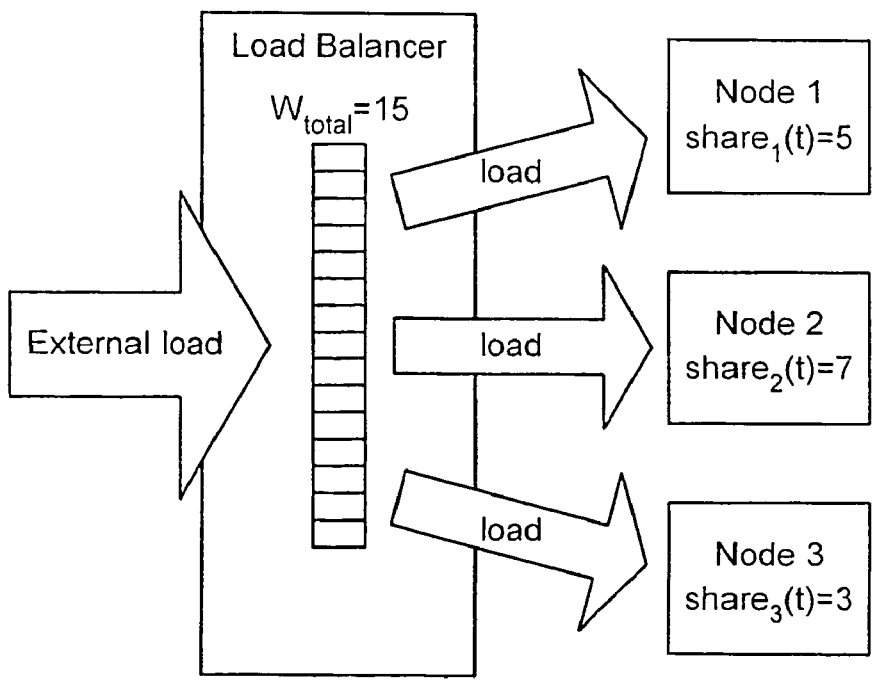

FIG. 4 illustrates a load balancer that receives tasks is the form of an external load and distributes those tasks to nodes 1, 2 and 3. Initially the share values of all the nodes are equal, so $share_i(0) = W_{total}/N$.

After some time, the share values are recalculated and communicated to the load balancer. (See FIG. 5). Node1 is operating at the desired load level, so there is no change in its share. Node2 has spare capacity and its share value is therefore increased. Node3 is overloaded and its share value is decreased. The load balancer distributes the load in proportion to the shares. The sum of shares is still greater than or equal to $W_{total}$, so the system is performing correctly.

Figure 6:
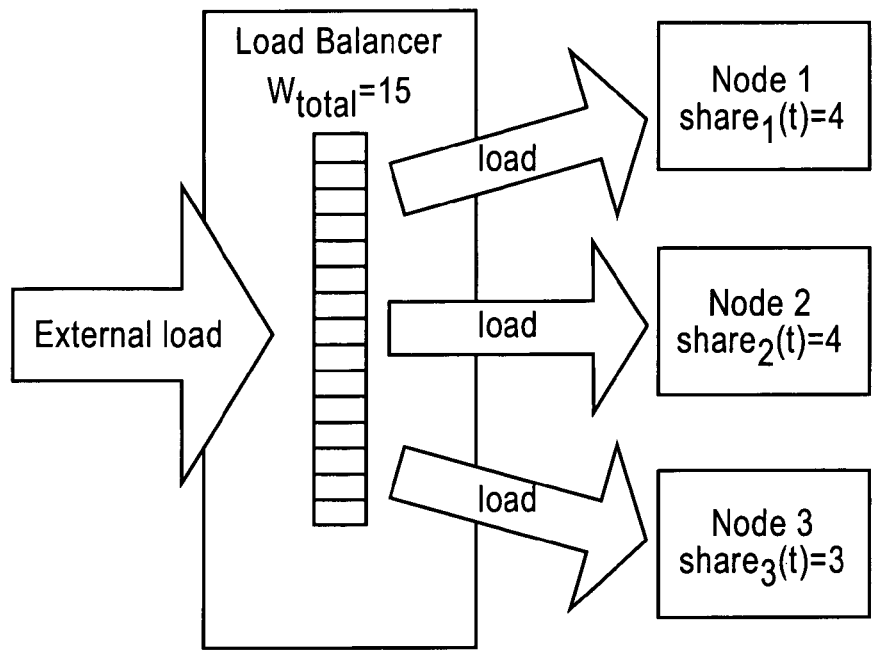

FIG. 6 illustrates a cluster overload situation. The shares for nodes 1 and 2 are decreased, with the result that the sum of the shares is less than $W_{total}$. Therefore, the cluster as a whole is overloaded. Overload control is invoked to reduce the load.

The aggregation of the load share values can be used as an indication of the need to increase overall processing capacity to meet the increased load. This is a direct consequence of a prolonged need to apply overload control and can be implemented by adding an attribute to the service aggregation object that depends on the total work attribute of the service aggregation object, and time. If a prolonged need to apply overload control is detected, the system can inform the operator of the need to add more processing capacity (i.e. nodes) to the load sharing group.

The nominal load value can be used in conjunction with the overload control to reach the desired level of overall processing capability (i.e. to limit the allowed overall processing capability). Over time, the system can in effect learn the correct nominal rate for a correlator in a given node; the nominal rate can be set to be equal to the observed rate if the load share value has not been changed for some period of time. The service aggregation object can also aggregate the rate attributes of the process groups. If the aggregation of the rate attributes is larger than the service request rate the system is designed to meet, and the overload control is not in use, then the system is able to process more work than intended. If there is a need to limit the amount of work the system can handle, the nominal load attributes can be decreased which will automatically start decreasing the share values. If the aggregation of the share values falls below the limit defined above, overload control is invoked and the system will automatically start limiting the amount of work processed by the nodes.

In comparison to overload control mechanisms that have been implemented in the past, this approach uses information calculated by an adaptive load balancing mechanism to implement overload control and dimensioning. One advantage of this is that the same simple information that can be used to control the adaptive load balancing function can be used as input to overload control. The computation of the information can be done in parallel in a distributed system.

The arrangement described above also provides a mechanism whereby an operator can intervene to limit the total amount of processing done by the system. This can conveniently be done by reducing the set value of the nominal load. This will have the effect of reducing the processing rate. This might be useful if another party had paid for a set amount of processing on the system: if the system were processing at a higher rate than the other party had paid for then the operator might want to curb the system. To test whether the processing rate was too high the operator could aggregate the rate attributes of the processors and compare that aggregate with the total rate agreed with the other party.

The arrangement described above can address the problems of how to make an indication to the system's overload control of the need to start reducing the load, how to make an indication to the system (and eventually, to the operator) of the need to increase processing capacity to meet the increased load, how to dimension the system so that a desired level of overall capacity is reached and how to implement all of the above in a distributed fashion to increase the performance and scalability of the system Simple overall values can be used to control the capacity of the system as a whole and yet allow flexible configuration of the individual nodes (both software and hardware). Detailed hardware information is not needed to control the load balancing function and the system will automatically adjust itself to the current software and hardware configuration.

The load share value can be used as an indication of a possible problem in the node, in the configuration of software executing on the node, or in the load balancing function itself. Should the load share value become and remain less than a pre-set lower limit, it can be taken as an indication that a node is not able to process even the minimum amount of work that the load balancer can assign to it. This can happen if the hardware of the node is simply not powerful enough, the hardware is not functioning properly, the software processing the requests is inefficient or buggy, there is some other software on the node that is consuming the processing capacity, or if the load balancer is not working properly. The probable cause of the problem can be deduced if the system also collects CPU usage data into a CPU usage attribute of the processes and aggregates it to a CPU usage attribute of the process group using the dependency network. If the load share value of the correlator linked to the process group falls below the threshold but the aggregated CPU usage of the group is close to zero, it may mean that there are some other processes not belonging to the process group in question that are using up the CPU and reconfiguration of the software may be in order. If, however, the CPU usage value of the process group is large but the load share value is small it means that a small amount of work burns a lot of CPU cycles. This may be because of problems in the software processing the requests which can be suspected if the aggregated rate of the process group is small. On the other hand, if the aggregated rate is large, the processes get a lot of service requests from the load balancer although their load share should be small, which may indicate a problem in the load balancing algorithm. If none of the previous conditions apply, then hardware problems may be the possible cause of the problem.

Figure 7:
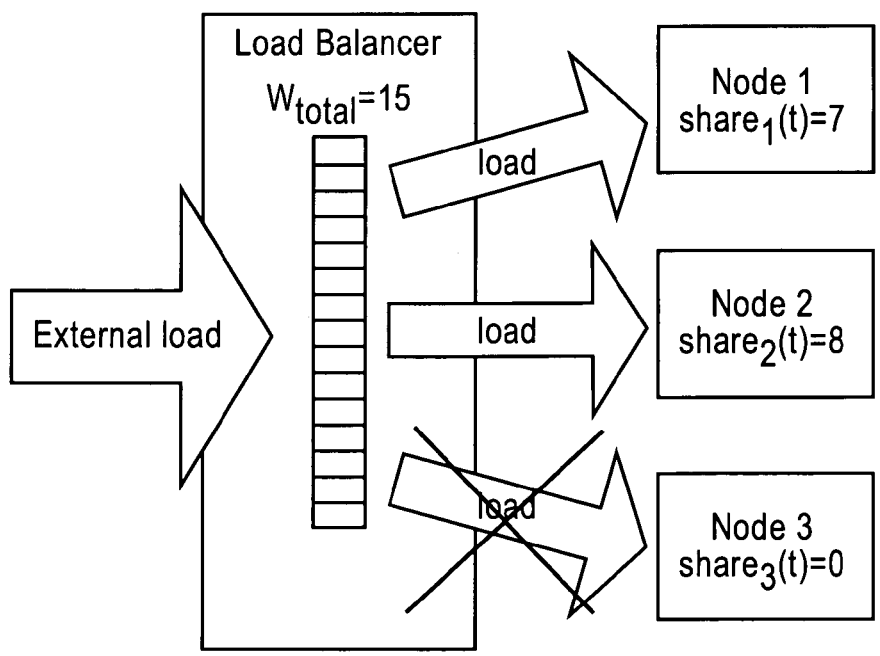

This arrangement can be used to address the problems of how to notice that a node cannot process the minimum load that can be assigned to it, how to utilise this as an indication of a possible problem in the node or in the load balancing function and how to implement it in a distributed fashion to increase the performance and scalability of the system FIG. 7 illustrates a node overload situation. The sum of the shares is greater than $W_{total}$ but the share for node 3 has fallen below the pre-set lower limit, which in this example is taken to be 1. In diagnosis of this problem, if the CPU usage for node 3's process group is low then the overload might be due to a problem in the node itself (for instance due to the malfunction of hardware or other software); if the CPU usage for node 3 is high then the overload might be due to a problem in the process group itself (if its rate attribute is small) or in the load balancer algorithm (if the rate attribute is large).

The object dependency network can also be applied to implement administrative control at an appropriate and desired level. This also includes the implementation of graceful shutdown behaviour for various entities in the system.

The values of the administrative state attributes of a node, process group, and a process are linked together using the dependency network so that the administrative state of the process group follows that of the node, and the administrative state of a process follows that of the process group. This set-up allows the operator to control the system at an appropriate level. For example, an operator may not be interested in controlling directly the processes that participate in the providing of a service, but he or she might want to control whether the whole service in a given node is available for use. This is made possible by the fact that if the operator changes the administrative state of the process group to locked, the dependency network automatically sets the administrative states of the processes depending on the process group to locked, and the processes can stop providing the service. Another example is a maintenance operation to the node, where an operator might want to take the physical hardware out of use and replace it with new hardware. This requires that the software running on the node and also on other nodes be informed of the fact. This is made possible by the fact that the administrative states of all process groups on the node depend on the administrative state of the node, and as soon as the administrative state of the node is changed, so are the administrative states of all objects that depend on it.

The graceful shutdown of an entity in the system can also be implemented using the dependency network. For example, an operator might want to express that a node should be taken out for maintenance gracefully, i.e. so that ongoing services on the node are allowed to be finalised before removing power from the node. The shutting down value of the administrative state attribute is propagated from the node to the process group, and finally to the processes themselves. As soon as the processes have processed all service requests to completion, they will change their administrative states to the locked value. A reversed dependency is constructed between the processes and the process group such that if the value of the administrative state of the process group is shutting down, and if the values of the administrative states of all processes belonging to the process group are changed to locked, the value of the administrative state of the process group will also become locked. A similar dependency is constructed between the process groups and the node, so that the value of the administrative state attribute of the node will automatically be changed to locked when all process groups become locked, which means that all service requests have been processed to completion and it is now safe to turn off power without losing any service instances.

Figure 8:
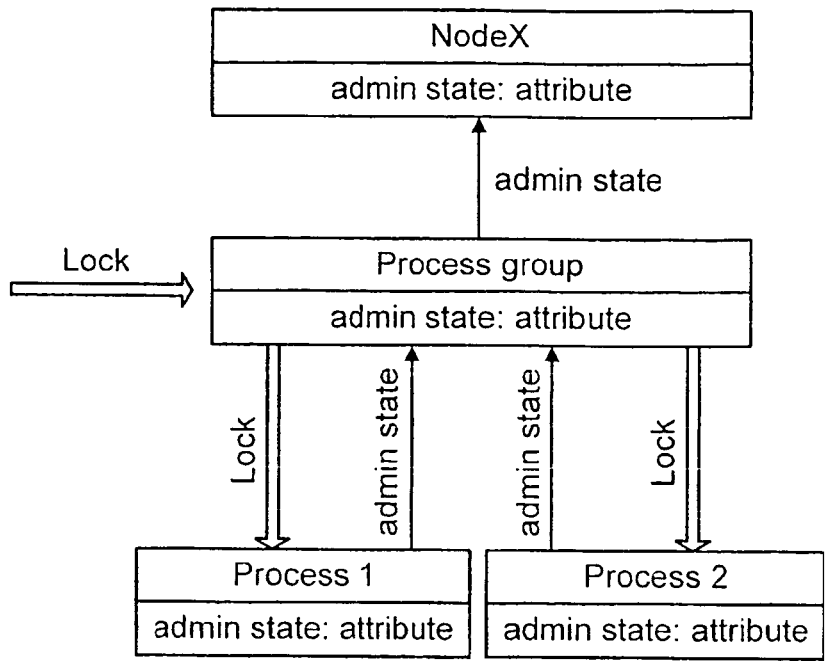
FIGS. 8 and 9 illustrate the propagation of shutdown-related status information through an object dependency network.
Figure 9:
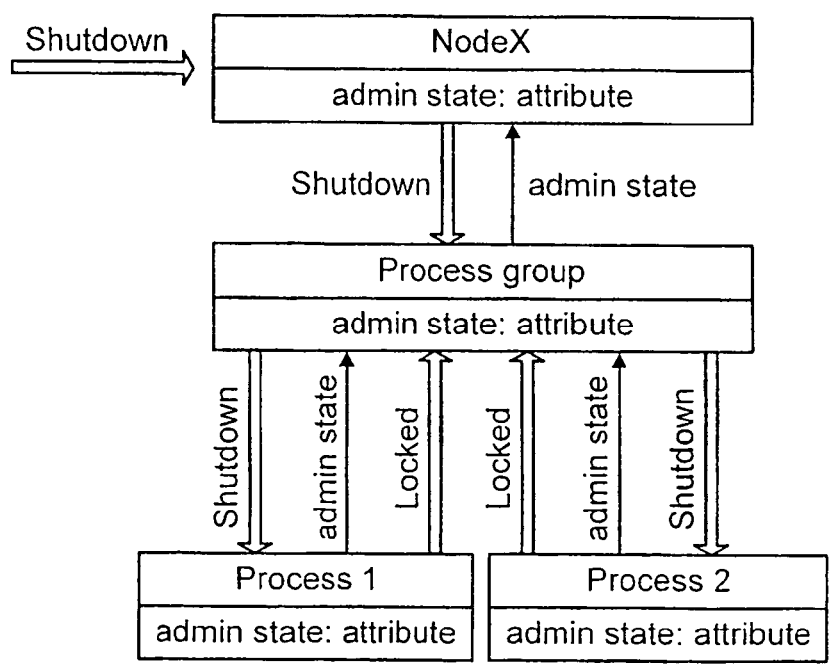

This is illustrated in FIGS. 8 and 9. In FIG. 8, the operator can lock the process group and all processes whose administrative state depends on the process group are automatically locked. Likewise, the operator can take node X out of operation for maintenance by shutting it down and all processes will follow. In FIG. 9 the operator can take node X out of operation for maintenance by shutting it down gracefully and all processes will follow without interrupting service. When processes become locked, so will the process group, and ultimately the node.

The node may be configured to propagate to a control unit a message indicating that its administrative state has been changed to locked. In response to this message power to the node can be shut off safely.

It should be noted that the hierarchies and dependencies described above are only examples, and the actual system can have more levels of hierarchies. Also, the dependencies can be defined in much more sophisticated ways thus allowing very complex relations to be expressed. The dependency network is a very powerful concept and lends itself to many other uses.

The systems described above can be implemented in software or hardware. The calculations are mainly carried out by the dependency network. It is preferred that implementation is done in a distributed fashion to make the system more scalable. The objects that aggregate attributes of or depend on objects in different nodes are most naturally to be placed into a centralised manager node because they make observations of and deductions regarding the overall system.

The load balancing and the control functions described above are independent of each other.

One potential implementation of the invention is in a server platform that could be used for hosting control and service layer applications (for instance CPS, HSS, SIP application server or IP RAN controllers) in a telecommunication network, especially an all IP network. The server hardware architecture could be based on a loosely coupled network of individual processing entities, for example individual computers. This can afford a high level of reliability and a high degree of flexibility in configuring the platform for different applications and capacity/performance needs. Preferably the hardware of each computer node can be based on de facto open industry standards, components and building blocks. The software can be based on an operating system such as Linux, supporting an object oriented development technology such as C++, Java or Corba. The processing entities are preferably coupled by a network connection, for example Ethernet, rather than via a bus. This facilitates loose interconnection of the processing entities. The architecture suitably comprises two computer pools: the front end IP Directors and the server cluster. The IP Director terminates IPsec (when needed) and distributes service requests further to server cluster (load balancing). The number of IP Directors can be scaled up to tens of computers and server nodes to a much larger number per installation. The IP Director load balances the signalling traffic coming in, typically SIP and SCTP. For SIP, load balancing is done based on call ids. For SCTP: load balancing is done by streams inside one connection. Other load balancing criteria can be used as well (for example based on source or destination addresses).

The present invention may include any feature or combination of features disclosed herein either implicitly or explicitly or any generalisation thereof, irrespective of whether it relates to the presently claimed invention. In view of the foregoing description it will be evident to a person skilled in the art that various modifications may be made within the scope of the invention.

The invention claimed is:

1. A method, for allocating load to processing nodes in a processing cluster arranged as an object dependency network, the method comprising:

establishing at a load allocation function a plurality of load allocation function attributes whose values are dependant on the values of attributes of the processing nodes, the load allocation function attributes comprising:

load ratio attributes, each load ratio attribute corresponding to a respective node and having a value indicating a load that has been processed by the respective node in a predetermined time period as a proportion of a nominal load to be processed, rate ratio attributes, each rate ratio attribute corresponding to the respective node and having a value indicating a rate of requests for processing that have been processed by the respective node in a predetermined time period as a proportion of a nominal rate of requests for processing to be processed, and load share attributes, each load share attribute corresponding to the respective node and having a value indicating a proportion of the total load on the processing cluster that is to be allocated to the respective node, wherein said each load share attribute is dependent on the load ratio attribute and the rate ratio attribute of the respective node;

receiving requests for processing;

determining to which of the processing nodes to allocate the requests for processing based on the load share attributes;

allocating requests for processing to each processing node in accordance with the load share attribute of the respective node; and when the load that has been processed by the respective node changes and/or the rate of requests for processing that have been processed by the respective node changes, automatically recalculating the load share attribute of the respective node.

2. The method as claimed in claim 1, wherein the determining comprises decreasing the load share attribute corresponding to the respective node by a first amount when the load ratio attribute for the respective node indicates that the rate of requests for processing that have been processed by the respective node in a predetermined time period as a proportion of a nominal rate of requests for processing to be processed is less than a first threshold.

3. The method as claimed in claim 2, wherein the determining comprises decreasing the load share attribute corresponding to the respective node by a second amount when the load ratio attribute for the respective node indicates that the rate of request for processing that have been processed in a predetermined time period as a proportion of a nominal rate of requests for processing to be processed by the respective node is greater than the first threshold and the rate ratio attribute for the respective indicates that the rate of requests for processing that have been processed by the respective node in a predetermined time period as a proportion of a nominal rate of requests for processing to be processed is less than a second threshold.

4. The method as claimed in claim 3, wherein the first threshold is greater than the second threshold and the first amount is greater than the second amount.

5. The method as claimed in claim 1, wherein the determining comprises increasing the load share attribute corresponding to the respective node by a third amount when the load ratio attribute for the respective node indicates that the rate of requests for processing that have been processed by the respective node in a predetermined time period as a proportion of a nominal rate of requests for processing to be processed is greater than a third threshold and the rate ratio attribute for the respective node indicates that the rate of requests for processing that have been processed by the respective node in a predetermined time period as a proportion of a nominal rate of requests for processing to be processed is between the third threshold and a fourth threshold.

6. The method as claimed in claim 5, wherein otherwise the load share attribute corresponding to the node is unchanged.

7. The method as claimed in claim 1, comprising adjusting the value of the nominal rate towards a currently observed rate if the load share attributes have remained substantially unchanged over a predetermined time period.

8. The method as claimed in claim 1, comprising reducing the nominal load if an aggregate rate of processing of the processing nodes of the cluster is determined to be greater than a pre-set threshold.

9. The method as claimed in claim 1, comprising declaring an error state if a load share attribute corresponding to the respective node remains less than a first threshold over a predetermined time period.

10. An apparatus, comprising:

a plurality of processors; and a load allocation function having a plurality of load allocation function attributes whose values are dependant on the values of attributes of the processors, the load allocation function attributes comprising:

load ratio attributes, each load ratio attribute corresponding to a respective processor and having a value indicating a load that has been processed by the respective processor in a predetermined time period as a proportion of a nominal load to be processed, rate ratio attributes, each rate ratio attribute corresponding to the respective processor and having a value indicating a rate of requests for processing that have been processed by the respective processor in a predetermined time period as a proportion of a nominal rate of requests for processing to be processed, and load share attributes, each load share attribute corresponding to the respective processor and having a value indicating a proportion of the total load on a cluster that is to be allocated to the respective processor, wherein said each load share attribute is dependent on the load ratio attribute and the rate ratio attribute of the respective processor, wherein the load allocation function is configured to receive requests for processing, determine to which of the processors to allocate the requests for processing based on the load share attributes, and allocate requests for processing to each processor in accordance with the load share attribute of the respective processor, and wherein the load allocation function is configured, when the load that has been processed by the respective processor changes and/or the rate of requests for processing that have been processed by the respective processor changes, to automatically recalculate the load share attribute of the respective processor.

11. An apparatus having a processor, the apparatus comprising:

processing means for processing;

load balancing means for balancing, the load balancing means having a plurality of load allocation function attributes whose values are dependant on the values of attributes of the processing means, the load allocation function attributes comprising:

load ratio attributes, each load ratio attribute corresponding to a respective processing means and having a value indicating a load that has been processed by the respective processing means in a predetermined time period as a proportion of a nominal load to be processed, rate ratio attributes, each rate ratio attribute corresponding to the respective processing means and having a value indicating a rate of requests for processing that have been processed by the respective processing means in a predetermined time period as a proportion of a nominal rate of requests for processing to be processed, and load share attributes, each load share attribute corresponding to the respective processing means and having a value indicating a proportion of a total load on a cluster that is to be allocated to the respective processing means, wherein said each load share attribute is dependent on the load ratio attribute and the rate ratio attribute of the respective processing means, wherein the load balancing means receives requests for processing, wherein the load balancing means determines to which of the processing means to allocate the requests for processing based on the load share attributes, wherein the load balancing means allocates requests for processing to each processing means in accordance with the load share attribute, of the respective node processing means, and wherein the load balancing means, when the load that has been processed by the respective processing means changes and/or the rate requests for processing that have been processed by the respective processing means changes, automatically recalculates the load share attribute of the processing means.

* * * * *